(12) United States Patent
Zhao et al.

(10) Patent No.: US 9,369,028 B2
(45) Date of Patent: Jun. 14, 2016

(54) ELECTRONICALLY COMMUTATED MOTOR

(71) Applicant: Zhongshan Broad-Ocean Motor Co., Ltd., Zhongshan (CN)

(72) Inventors: Yong Zhao, Zhongshan (CN); Yunsheng Chen, Zhongshan (CN); Wenqing Bian, Zhongshan (CN); Yonghua Wu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 14/541,174

(22) Filed: Nov. 14, 2014

(65) Prior Publication Data

US 2016/0036300 A1     Feb. 4, 2016

(30) Foreign Application Priority Data

Jul. 30, 2014   (CN) ...................... 2014 2 0427025 U

(51) Int. Cl.
*H02H 7/08*      (2006.01)
*H02K 11/00*     (2016.01)

(52) U.S. Cl.
CPC .......... *H02K 11/001* (2013.01); *H02K 11/0073* (2013.01); *H02K 11/33* (2016.01)

(58) Field of Classification Search
CPC ............ H02K 11/001; H02K 11/0073; H02K 11/044; H02P 6/002
See application file for complete search history.

(56) References Cited

U.S. PATENT DOCUMENTS

| | | | | |
|---|---|---|---|---|
| 2010/0237814 A1* | 9/2010 | Bi | .............. | H02P 6/16 318/400.14 |
| 2014/0265957 A1* | 9/2014 | Hu | ............. | H02P 6/08 318/400.15 |
| 2015/0077035 A1* | 3/2015 | Zhao | ....................... | H02P 25/04 318/817 |
| 2015/0115851 A1* | 4/2015 | Zhao | ....................... | H02P 27/08 318/400.06 |

* cited by examiner

*Primary Examiner* — Jeffrey Donels
(74) *Attorney, Agent, or Firm* — Matthias Scholl, PC; Matthias Scholl

(57) ABSTRACT

An electronically commutated motor, including: a motor body and a motor controller. The motor controller includes a control box and a circuit board disposed in the control box. The circuit board includes a microprocessor, an inverter circuit, a gear detection circuit, and a power supply. The gear detection circuit includes a plurality of current sensing units. The output end of the power supply supplies power to each circuit, and a first AC input end of the power supply is connected to a first power input line N. The gear detection circuit is connected to a plurality of gear input lines. At least one of the gear input lines is selected to be in an energized state. Each gear input line is correspondingly connected to a first input end of one of the current sensing units.

9 Claims, 3 Drawing Sheets

ELECTRONICALLY COMMUTATED MOTOR

CROSS-REFERENCE TO RELATED APPLICATIONS

Pursuant to 35 U.S.C. §119 and the Paris Convention Treaty, this application claims the benefit of Chinese Patent Application No. 201420427025.5 filed Jul. 30, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to an electronically commutated motor (ECM).

2. Description of the Related Art

Conventional permanent-split capacitor (PSC) motors consume a large amount of energy, produce much noise, and have low efficiency. Permanent magnet synchronous motors, such as, e.g., ECM motors, are provided with a motor controller, so that they have high reliability, high controllability, and low noise. It is a trend to substitute an ECM motor for a PSC motor. However, the substitution may result in the following problems:

1) The function of the ECM motor is single and not applicable to different workplaces, for example, operating parameters like the supply voltage cannot be directly set;

2) Conventionally, when an ECM is substituted for a PSC motor, a current sensor is serially connected to the input terminal of the gears; and the gears are in electric connection to one another. When an ECM controlled by a 24 VAC signal is replaced, signal coupling tends to occur, the heating wires tend to malfunction which is a hidden danger;

3) When an ECM controlled by a 24 VAC signal is replaced, the current signal flowing in the current sensor at the input terminal of the motor is weak, and it is difficult to determine whether the gear signals are effective;

4) The state of each gear input line is detected by a current transformer and related circuits, however, the current transformer has a large volume and high product costs and occupies relatively large space of the motor controller, thereby decreasing the heat dissipation of the motor controller; and 5) A plurality of sensing units of the current transformer are embedded in a wiring plug of the motor, the installation of which is difficult, thereby lowering the production efficiency and making large scale production difficult.

SUMMARY OF THE INVENTION

In view of the above-described problems, it is one objective of the invention to provide an ECM that has a simple structure and is adapted to substitute for a PSC and existing ECMs with 24 VAC as a gear input signal. The substitution is easy, the wiring is convenient, the involved cost is low, the signal coupling is prevented, and the safety and reliability are high.

To achieve the above objective, in accordance with one embodiment of the invention, there is provided an ECM, comprising: a motor body; and a motor controller, the motor controller comprising a control box and a circuit board disposed in the control box. The circuit board comprises a microprocessor, an inverter circuit, a gear detection circuit, and a power supply. The microprocessor, the inverter circuit, the gear detection circuit, and the power supply are all integrated on the circuit board; the gear detection circuit comprises a plurality of current sensing units. An output end of the power supply supplies power to each circuit, and a first AC input end of the power supply is connected to a first power input line N. The gear detection circuit is connected to a plurality of gear input lines; at least one of the gear input lines is selected to be in an energized state. Each gear input line is correspondingly connected to a first input end of one of the current sensing units. An output end of each current sensing unit is connected to an input end of the microprocessor. The microprocessor selects operating parameters of the motor according to a detected signal of an energization state of each gear input line and controls the motor to operate according to selected operating parameters. The current sensing units detect signals from the gear input lines, and the signals are a 24 V low voltage AC signal or a 115 V or 230 V high voltage AC signal. When the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L. When the 24 V low voltage AC signal is input from the gear input lines, the second AC input end of the power supply is connected to the second power input line L, and the second AC input end of the power supply is in parallel connection to the second AC input end of the power supply and is connected to a common lead COM; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode.

In a class of this embodiment, when the 24 V low voltage AC signal is input from the gear input lines, the second AC input end of the power supply is connected to the second power input line L, and the second AC input end of the power supply is in parallel connection to the second AC input end of the power supply and is connected to the common lead via an amplifying circuit.

In a class of this embodiment, the amplifying circuit comprises a first capacitor, a sixth resistor, and a seventh resistor, and the first capacitor is in parallel connection to the sixth resistor and then is in series connection to the seventh resistor.

In a class of this embodiment, each circuit protection unit further comprises a resistor which is in series connection to the diode.

In a class of this embodiment, resistances of the resistors of the circuit protection units are unequal so as to form different energization signals input to the gear input lines; when at least two gear input lines are in an energization state, the microprocessor compares energization signal values of the gear input lines and controls the motor to operate according to a gear outputting a biggest energization signal.

In a class of this embodiment, when the 115 V or 230 V high voltage AC signal is input from the gear input lines, the second AC input end of the power supply is in parallel connection to the second AC input end of the power supply and then connected to the second power input line L via a connection terminal through short-circuit connection.

In a class of this embodiment, the circuit protection units employ a hall current sensor unit, and an output terminal of the hall current sensor unit is connected to the microprocessor via an amplifying and filtering circuit.

In a class of this embodiment, the gear input lines are five in number, the current sensing units are five in number, and the circuit protection units are five in number.

In a class of this embodiment, the power supply comprises an ECM filter circuit, a rectifier & filter circuit, and a DC-DC transfer circuit; an input end of the ECM filter circuit is connected to an AC input, and an output end of the ECM filter circuit is connected to an input end of the rectifier & filter circuit; the rectifier & filter circuit outputs a busbar voltage and is connected to the DC-DC transfer circuit, the DC-DC transfer circuit output a voltage of +15 V and +5 V, the busbar voltage, +15 V and +5 V are all supplied for corresponding circuits.

Advantages according to embodiments of the invention are summarized as follows:

1) The invention provides an ECM comprising: a motor body and a motor controller. The motor controller comprises a control box and a circuit board disposed in the control box. The circuit board comprises a microprocessor, an inverter circuit, a gear detection circuit, and a power supply. The microprocessor, the inverter circuit, the gear detection circuit, and the power supply are all integrated on the circuit board; the gear detection circuit comprises a plurality of current sensing units. An output end of the power supply supplies power to each circuit, and a first AC input end of the power supply is connected to a first power input line N. The gear detection circuit is connected to a plurality of gear input lines; at least one of the gear input lines is selected to be in an energized state. Each gear input line is correspondingly connected to a first input end of one of the current sensing units. An output end of each current sensing unit is connected to an input end of the microprocessor. The microprocessor selects operating parameters of the motor according to a detected signal of an energization state of each gear input line and controls the motor to operate according to selected operating parameters. The current sensing units detect signals from the gear input lines, and the signals are a 24 V low voltage AC signal or a 115 V or 230 V high voltage AC signal. When the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L. When the 24 V low voltage AC signal is input from the gear input lines, the second AC input end of the power supply is connected to the second power input line L, and the second AC input end of the power supply is in parallel connection to the second AC input end of the power supply and is connected to a common lead COM; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode. The ECM has a simple structure and is adapted to substitute for a PSC and existing ECMs with 24 VAC as gear input signal. The substitution is easy, the wiring is convenient, the involved cost is low, the signal coupling is prevented, and the safety and reliability are high.

2) When the 24 V low voltage AC signal is input from the gear input lines, the second AC input end of the power supply is connected to the second power input line L, and the second AC input end of the power supply is in parallel connection to the second AC input end of the power supply and is connected to the common lead via an amplifying circuit. Thus, the gear input lines can obtain stronger current signals, the microprocessor can precisely judge whether the gear signals are effective, thereby ensuring the precise and reliable control.

3) Each circuit protection unit further comprises a resistor which is in series connection to the diode. Resistances of the resistors of the circuit protection units are unequal so as to form different energization signals input to the gear input lines; when at least two gear input lines are in an energization state, the microprocessor compares energization signal values of the gear input lines and controls the motor to operate according to a gear outputting a biggest energization signal. Thus, the control is reliable, and the gear outputting the biggest energization signal can operate in advance.

4) The second AC input end of the power supply is in parallel connection to the second AC input end of the power supply and then connected to the second power input line L via a connection terminal through short-circuit connection. Thus, the connection is convenient and reliable.

5) The circuit protection units employ a hall current sensor unit, which has a small volume and low cost, and can effectively improve the heat dispersion of the motor controller. An output terminal of the hall current sensor unit is connected to the microprocessor via an amplifying and filtering circuit, which can effectively reduce the current fluctuation at the output end of the gear detection circuit, and improve the precision and reliability of the detection of the microprocessor.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an electronically commutated motor (ECM) are described below. It should be noted that the following examples are intended to describe and not to limit the invention.

Figure 1:
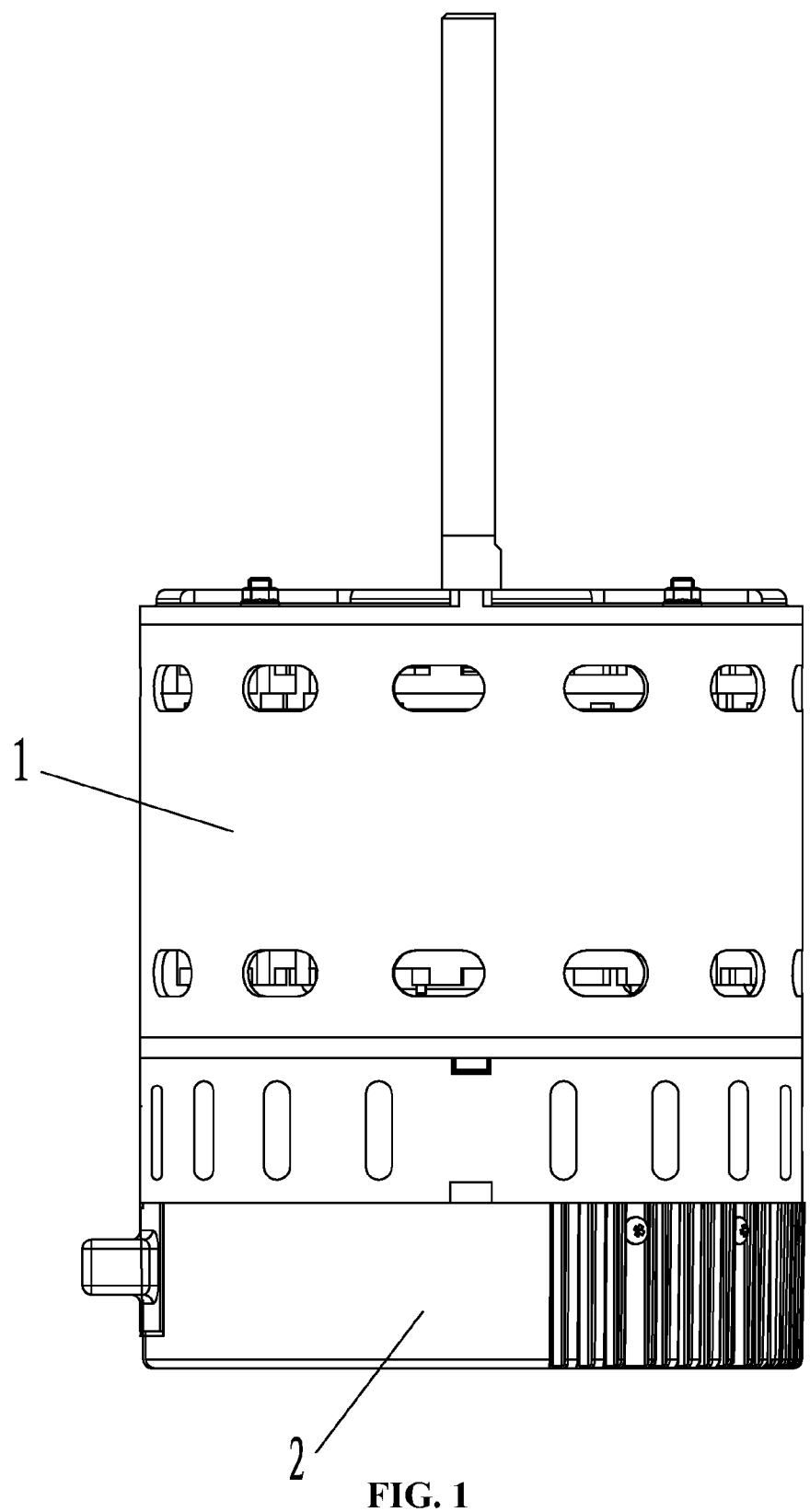
FIG. 1 is a schematic diagram of an electronically commutated motor (ECM) in accordance with one embodiment of the invention.
Figure 2:
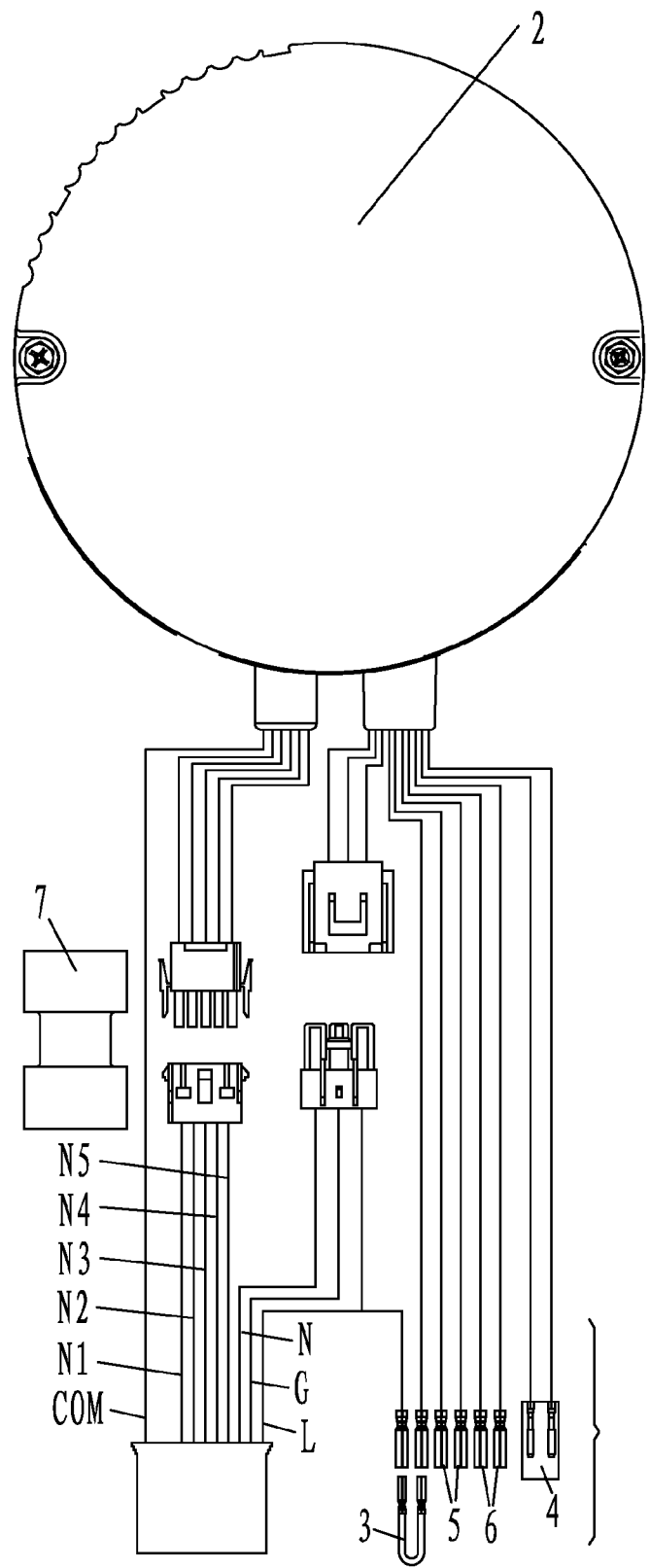
FIG. 2 is another schematic diagram of an electronically commutated motor (ECM) in accordance with one embodiment of the invention.
Figure 3:
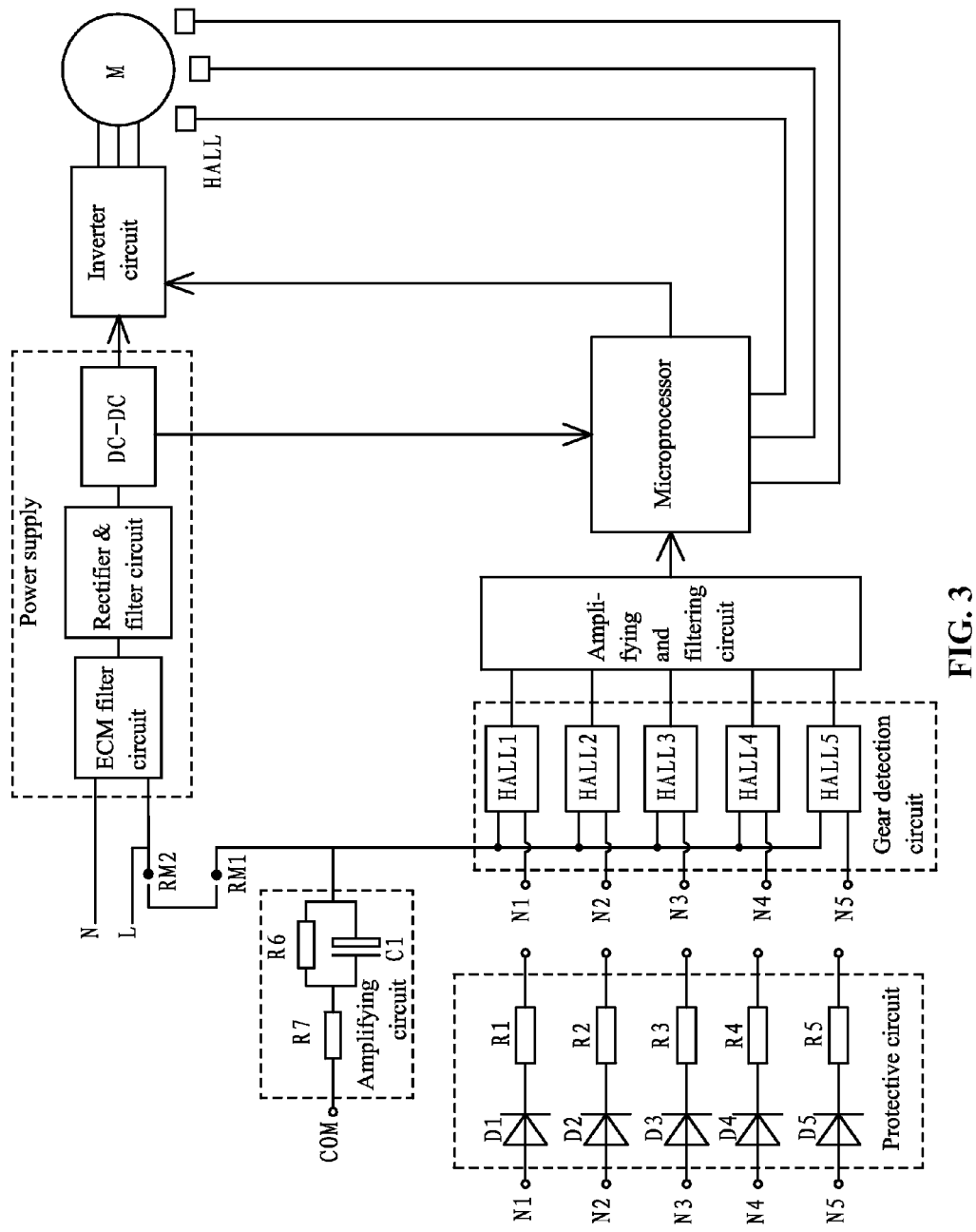
FIG. 3 is a circuit diagram of an electronically commutated motor (ECM) in accordance with one embodiment of the invention.

As shown in FIGS. 1-3, an electronically commutated motor (ECM) comprises: a motor body 1 and a motor controller 2. The motor controller comprises a control box and a circuit board disposed in the control box. The circuit board comprises a microprocessor, an inverter circuit, a gear detection circuit, and a power supply. The power supply comprises an ECM filter circuit, a rectifier & filter circuit, and a DC-DC transfer circuit; an input end of the ECM filter circuit is connected to an AC input, and an output end of the ECM filter circuit is connected to an input end of the rectifier & filter circuit; the rectifier & filter circuit outputs a busbar voltage and is connected to the DC-DC transfer circuit, the DC-DC transfer circuit output a voltage of +15 V and +5 V, the busbar voltage, +15 V and +5 V are all supplied for corresponding circuits. The Hall element detects the rotor position signal of the motor and transmits the position signal to the microprocessor. The microprocessor controls the motor to operate through the inverter circuit. A first AC input end of the power supply is connected to a first power input line N. The gear detection circuit is connected to five gear input lines (N1, N2, N3, N4, and N5). At least one of the gear input lines is selected to be in an energized state. The gear detection circuit comprises five current sensing units (HALL 1, HALL 2, HALL 3, HALL 4, and HALL 5). The circuit protection units employ a hall current sensor unit, which can be purchased from the market. Each gear input line is correspondingly connected to a first input end of one of the current sensing units. The microprocessor selects operating parameters of the motor according to a detected signal of an energization state of each gear input line and controls the motor to operate according to selected operating parameters. The current sensing units detect signals from the gear input lines, and the signals are a 24 V low voltage AC signal or a 115 V or 230 V high voltage AC signal.

When the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L.

When the 24 V low voltage AC signal is input from the gear input lines, the second AC input end of the power supply is connected to the second power input line L, and the second AC input end of the power supply is in parallel connection to the second AC input end of the power supply and is connected to a common lead COM; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode.

For example, if the gear input line N1 is selected to be energized, and 24 VAC is input, because the diode is conductive from the positive direction and is blocked from the negative direction, there is no signal coupling between the gear input line N1 which is conductive and the gear input line N2 or N3 or N4 or N5 which is blocked. Thus, the connection is simple, convenient, safe, and reliable.

When the 24 V low voltage AC signal is input from the gear input lines, the second AC input end of the power supply is connected to the second power input line L, and the second AC input end of the power supply is in parallel connection to the second AC input end of the power supply and is connected to the common lead via an amplifying circuit. The amplifying circuit comprises a first capacitor C1, a sixth resistor R6, and a seventh resistor R7, and the first capacitor C1 is in parallel connection to the sixth resistor R6 and then is in series connection to the seventh resistor R7. The amplifying circuit can ensure the gear input lines obtains stronger current signals, the microprocessor can precisely judge whether the gear signals are effective, thereby ensuring the precise and reliable control.

Each circuit protection unit further comprises a resistor which is in series connection to the diode. The first circuit protection unit comprises a first diode D1 and a first resistor R1. The second circuit protection unit comprises a second diode D2 and a second resistor R2. The third circuit protection unit comprises a third diode D3 and a third resistor R3. The fourth circuit protection unit comprises a fourth diode D4 and a fourth resistor R4. The fifth circuit protection unit comprises a fifth diode D5 and a fifth resistor R5.

The resistances of the resistors R1, R2, R3, R4, and R5 of the circuit protection units are unequal so as to form different energization signals input to the gear input lines; when at least two gear input lines are in an energization state, the microprocessor compares energization signal values of the gear input lines and controls the motor to operate according to a gear outputting a biggest energization signal.

Presume the resistance of R1 is less than the resistance of R2, when the gear input line N1 and the gear input line N2 are energized simultaneously, the two lines are both supplied with 24 VAC signal, according to I=U/R, under the same voltage, the smaller the resistance, the greater the current. Thus, the gear input line N1 having a smaller resistance has a larger current. The microprocessor compares energization signal values of the gear input lines N1 and N2 and controls the motor to operate according to the gear input line N1.

When the 115 V or 230 V high voltage AC signal is input from the gear input lines, the second AC input end of the power supply is in parallel connection to the second AC input end of the power supply and then connected to the second power input line L via a connection terminal 3 through short-circuit connection (RM1, RM2). The motor controller further comprises a pair of communication terminals 4, a pair of turning terminals 5, and a pair of voltage doubling conversion terminals 6. The pair of turning terminals 5 are short-circuit connected via the connection terminal 3 to control the motor to rotate forward or reverse. The pair of voltage doubling conversion terminals 5 are short-circuit connected via the connection terminal 3 to control the motor to operate at one-fold voltage or two-fold voltage. The pair of communication terminals 4 are short-circuit connected via the connection terminal 3 to communicate with outsides.

The protective circuit is disposed on a connector 7. When the 24 V low voltage AC signal is input into the gear input lines, the connector 7 comprising the protective circuit is connected to the gear input line through plugging in.

The output terminal of the hall current sensor unit is connected to the microprocessor via an amplifying and filtering circuit, which can effectively reduce the current fluctuation at the output end of the gear detection circuit, and improve the precision and reliability of the detection of the microprocessor.

The gear input lines are five (N1, N2, N3, N4, and N5) in number, or three (N1, N2, and N3) in number.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electronically commutated motor, comprising:
   a) a motor body; and
   b) a motor controller, the motor controller comprising a control box and a circuit board disposed in the control box; the circuit board comprising a microprocessor, an inverter circuit, a gear detection circuit, and a power supply; wherein
   the microprocessor, the inverter circuit, the gear detection circuit, and the power supply are all integrated on the circuit board; the gear detection circuit comprises a plurality of current sensing units;
   an output end of the power supply supplies power to each circuit, and a first AC input end of the power supply is connected to a first power input line N;
   the gear detection circuit is connected to a plurality of gear input lines; at least one of the gear input lines is selected to be in an energized state;
   each gear input line is correspondingly connected to a first input end of one of the current sensing units;
   an output end of each current sensing unit is connected to an input end of the microprocessor;
   the microprocessor selects operating parameters of the motor according to a detected signal of an energization state of each gear input line and controls the motor to operate according to selected operating parameters;

the current sensing units detect signals from the gear input lines, and the signals are a 24 V low voltage AC signal or a 115 V or 230 V high voltage AC signal;

when the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L;

when the 24 V low voltage AC signal is input from the gear input lines, the second AC input end of the power supply is connected to the second power input line L, and the second AC input end of the power supply is in parallel connection to the second AC input end of the power supply and is connected to a common lead COM; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode.

2. The motor of claim 1, wherein when the 24 V low voltage AC signal is input from the gear input lines, the second AC input end of the power supply is connected to the second power input line L, and the second AC input end of the power supply is in parallel connection to the second AC input end of the power supply and is connected to the common lead via an amplifying circuit.

3. An electronically commutated motor, comprising:
a) a motor body; and
b) a motor controller, the motor controller comprising a control box and a circuit board disposed in the control box; the circuit board comprising a microprocessor, an inverter circuit, a gear detection circuit, and a power supply; wherein the microprocessor, the inverter circuit, the gear detection circuit, and the power supply are all integrated on the circuit board; the gear detection circuit comprises a plurality of current sensing units;

an output end of the power supply supplies power to each circuit, and a first AC input end of the power supply is connected to a first power input line N;

the gear detection circuit is connected to a plurality of gear input lines; at least one of the gear input lines is selected to be in an energized state;

each gear input line is correspondingly connected to a first input end of one of the current sensing units;

an output end of each current sensing unit is connected to an input end of the microprocessor;

the microprocessor selects operating parameters of the motor according to a detected signal of an energization state of each gear input line and controls the motor to operate according to selected operating parameters;

the current sensing units detect signals from the gear input lines, and the signals are a 24 V low voltage AC signal or a 115 V or 230 V high voltage AC signal;

when the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L;

when the 24 V low voltage AC signal is input from the gear input lines, the second AC input end of the power supply is connected to the second power input line L, and the second AC input end of the power supply is in parallel connection to the second AC input end of the power supply and is connected to a common lead COM via an amplifying circuit; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode; and the amplifying circuit comprises a first capacitor, a first resistor, and a second resistor, and the first capacitor is in parallel connection to the first resistor and then is in series connection to the second resistor.

4. The motor of claim 3, wherein each circuit protection unit further comprises a resistor which is in series connection to the diode.

5. The motor of claim 4, wherein resistances of the resistors of the circuit protection units are unequal so as to form different energization signals input to the gear input lines; when at least two gear input lines are in an energization state, the microprocessor compares energization signal values of the gear input lines and controls the motor to operate according to a gear outputting a biggest energization signal.

6. The motor of claim 1, wherein when the 115 V or 230 V high voltage AC signal is input from the gear input lines, the second AC input end of the power supply is in parallel connection to the second AC input end of the power supply and then connected to the second power input line L via a connection terminal through short-circuit connection.

7. An electronically commutated motor, comprising:
a) a motor body; and
b) a motor controller, the motor controller comprising a control box and a circuit board disposed in the control box; the circuit board comprising a microprocessor, an inverter circuit, a gear detection circuit, and a power supply; wherein the microprocessor, the inverter circuit, the gear detection circuit, and the power supply are all integrated on the circuit board; the gear detection circuit comprises a plurality of current sensing units;

an output end of the power supply supplies power to each circuit, and a first AC input end of the power supply is connected to a first power input line N;

the gear detection circuit is connected to a plurality of gear input lines; at least one of the gear input lines is selected to be in an energized state;

each gear input line is correspondingly connected to a first input end of one of the current sensing units;

an output end of each current sensing unit is connected to an input end of the microprocessor;

the microprocessor selects operating parameters of the motor according to a detected signal of an energization state of each gear input line and controls the motor to operate according to selected operating parameters;

the current sensing units detect signals from the gear input lines, and the signals are a 24 V low voltage AC signal or a 115 V or 230 V high voltage AC signal;

when the 115 V or 230 V high voltage AC signal is input from the gear input lines, a second AC input end of the power supply is connected to a second power input line L, and a second input end of the current sensing units is in parallel connection to the second AC input end of the power supply and is connected to the second power input line L;

when the 24 V low voltage AC signal is input from the gear input lines, the second AC input end of the power supply is connected to the second power input line L, and the second AC input end of the power supply is in parallel connection to the second AC input end of the power supply and is connected to a common lead COM; the 24 V low voltage AC signal is input into the gear input lines via a protective circuit; the protective circuit comprises a plurality of circuit protection units, each circuit protection unit is connected to one corresponding gear input line, and each circuit protection unit comprises at least a diode; and the circuit protection units comprise a hall current sensor unit, and an output terminal of the hall current sensor unit is connected to the microprocessor via an amplifying and filtering circuit.

8. The motor of claim 1, wherein the gear input lines are five in number, the current sensing units are five in number, and the circuit protection units are five in number.

9. The motor of claim 1, wherein the power supply comprises an ECM filter circuit, a rectifier & filter circuit, and a DC-DC transfer circuit;

an input end of the ECM filter circuit is connected to an AC input, and an output end of the ECM filter circuit is connected to an input end of the rectifier & filter circuit;

the rectifier & filter circuit outputs a busbar voltage and is connected to the DC-DC transfer circuit;

the DC-DC transfer circuit output a voltage of +15 V and +5 V; and the busbar voltage, +15 V and +5 V are all supplied for corresponding circuits.

\* \* \* \* \*